HIGH FREQUENCY PROPORTIONAL FLUID AMPLIFIER

Filed Oct. 15, 1964 Sheet 1 of 2

INVENTOR
PETER BAUER

BY Hurvitz & Rose

ATTORNEYS

INVENTOR
PETER BAUER

BY Hurvitz & Rose

ATTORNEYS

United States Patent Office 3,434,487

Patented Mar. 25, 1969

3,434,487

HIGH FREQUENCY PROPORTIONAL FLUID AMPLIFIER

Peter Bauer, Bethesda, Md., assignor to Bowles Engineering Corporation, Silver Spring, Md., a corporation of Maryland Filed Oct. 15, 1964, Ser. No. 404,005
Int. Cl. F15c 1/08, 1/12, 1/14
U.S. Cl. 137—81.5 20 Claims The present invention relates to pure fluid amplifiers and, more particularly, to pure fluid amplifiers capable of responding to high frequencies and/or having a rapid response to pulse input signals.

One of the difficulties with pure fluid systems in the configurations in which they presently exist is their relatively low speed of response. The speed of response of the more conventional pure fluid systems is of the order of 1 kilocycle. By various known techniques, the speed of response may be raised to 2 or 3 kilocycles through subminiaturization of the elements and the use of light fluids, such as hydrogen or helium.

Pure fluid systems fall basically into two categories: The momentum interchange type and the boundary layer type. In the momentum interchange type of apparatus, and for purposes of explanation; unbiased units are considered; the power stream divides equally between, for instance, two output channels and, in order to produce a differential in pressure between the two output channels, an incoming or control side stream is directed against the power stream and produces deflection thereof as a result of momentum interchange between the control and power streams. In a device of this type, all of the deflection energy must be derived from the control signal and the rate at which energy can be delivered determines the speed at which the device may operate. The energy required and, therefore, the rate at which fluid must be delivered is quite high since the stream is always operating about its most stable position; that is, the undeflected or central position which the stream attempts to maintain due to its own momentum.

The other type of pure fluid system, e.g., boundary layer devices, also operates normally about its most stable position, i.e., with the power stream deflected by boundary layer pressure effects into contact with or immediately adjacent to one of the sidewalls of the apparatus. In such a system, a certain amount of energy must be delivered to produce deflection of the mainstream since, essentially, the stream is being pushed uphill by the control stream, i.e. the control signal is attempting to move the stream away from its point of maximum stability. The operation requires a relatively large amount of energy. Relating this to an input signal, the maximum rate of delivery of energy is determined by the maximum power of the control signal. If the control signal is oscillating and the frequency of oscillation is high, it requires a time equal to a number of cycles of the input signal for sufficient energy to be delivered to the system to deflect the mainstream to the opposite wall. Thus, the frequency of response of the apparatus is less than the frequency of the input signal and an averaging effect is obtained Where the system is operated with input pulses, the maximum amplitude of the input pulse determines the rate at which energy can be delivered and, where the energy required to shift the stream is relatively large, which is the usual case in a boundary layer system, a good portion of the pulse is dissipated before the stream is deflected. Therefore, the rise time of the apparatus is low relative to the input pulse rise time.

It is an object of the present invention to provide a pure fluid amplifier having a frequency response up to at least 10 kilocycles per second.

It is another object of the present invention to materially increase the frequency of or decrease the time of response of a pure fluid amplifier by operating a boundary layer amplifier as an oscillator in which the power stream oscillates about the apex of a flow divider situated between two output passages and in which deflection of the oscillating power stream relative to the divider is controlled by input signals.

It is another object of the present invention to employ a boundary layer amplifier as a pure fluid oscillator in which the power stream oscillates about a central region of the device such that the stream is always in or closely adjacent its region of maximum instability and in which control signals are applied to modify deflection of the stream within this region thereby modulating the basic oscillator frequency and amplitude of output signal with the control signal permitting the device to be operated at frequencies of from one-fifth to one-tenth of the frequency of the oscillator.

Yet another object of the present invention is to provide a pure fluid logic element having at least two stable states in which the stream is oscillated when in each of its stable states and maintenance in a region of relative instability.

The above and still further objects, features and advantages of the present invention will become apparent upon consideration of the following detailed description of one specific embodiment thereof, especially when taken in conjunction with the accompanying drawings, wherein:

FIGURE 1 is a front view of a conventional pure fluid proportional amplifier;

FIGURES 2*a* and 2*b* are graphs illustrating the effects of delay in response of the fluid amplifier of FIGURE 1 on pulse rise time and frequency response, respectively, of the device;

Figure 1:
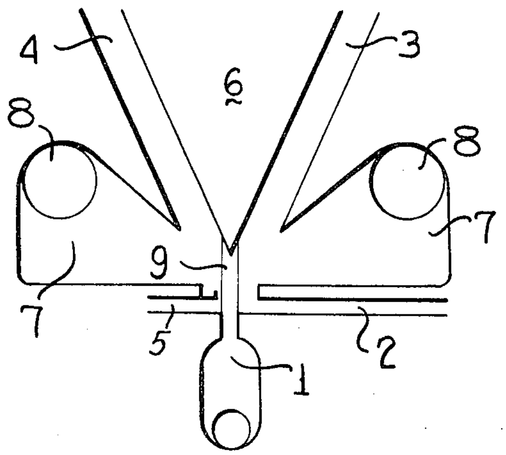

Referring specifically to FIGURE 1, there is illustrated a conventional pure fluid momentum interchange amplifier having a power nozzle 1, a right control nozzle 2, a left control nozzle 5 and output passages 3 and 4 separated by a centrally located and symmetrical divider 6. The enlarged open regions 7 are vented, for instance, to the atmosphere through vents 8 which are provided to prevent or to minimize boundary layer effects in the system. In a device of this type, in the absence of any flow from the control nozzles 2 or 5, the power stream, which is designated by the reference numeral 9, flows along the center of the device dividing at the apex of the divider 6 equally into the channels 3 and 4. This is the position of maximum stability of the power stream for an amplifier of this type and the energy required to divert the stream must be supplied completely by the signal applied to the control nozzles. The amount of energy required to deflect the stream 9 to a sufficient extent to produce a detectable difference in pressures or flow rates or energies delivered to the passages 3 and 4 is a function of the basic design of the system. Specifically, in an amplifier of this type, the apex of the divider 6 may be located only three nozzle widths downstream of the nozzle 1. Thus, the distance available for deflecting the stream 9 is relatively small and, in order to produce a desired or detectable deflection, the angle through which the stream 9 is deflected must be relatively large. Thus, the energy delivered to effect this angle of deflection must be relatively large. Related in terms of a pulse input, the elapsed time required to deliver the amount of energy necessary to deflect the stream may be considerably greater than the rise time of the input pulse.

Figure 2A:
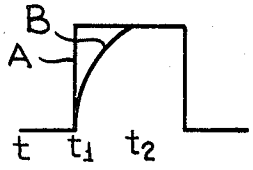

Referring specifically to FIGURE 2*a* of the accompanying drawings, there is illustrated, by the waveform A, an idealized form of square wave input pulse plotted against a time base $t$. Assuming that an input pulse applied to the control nozzle 2 begins to rise at a time $t_1$, the rise time characteristic of the signal in the output passage 4 appears as the waveform B with the output pulse reaching a maximum amplitude at a time $t_2$. It is apparent that, in some portion of the interval between the time $t_1$ and $t_2$, the input signal is not available to the normal measuring instruments or to another fluid amplifier since not enough signal is available in the output channel or channels to induce movement of the fluid into further fluid systems or into a mechanical or electrical measuring instrument.

Figure 2B:
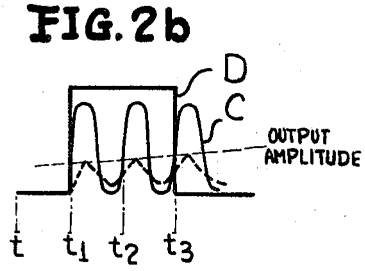

The waveform C of FIGURE 2*b* illustrates an oscillatory input signal of period $(t_2-t_1)$ and illustrates the effect of time delay upon the development of an output signal in the output channel 4. If the response time of the amplifier is $(t_3-t_1)$ then the frequency of the applied signal is sufficiently high that the system cannot deflect the stream 9 before the maximum amplitude of the input frequency begins to fall. Thus, the whole effect of the signal is lost on an amplifier of this type. As indicated before, the maximum frequency of response of a system of this sort may, by employing all of the techniques presently known to the inventor, be raised to about 3 kilocycles per second but at great cost.

Figure 3:
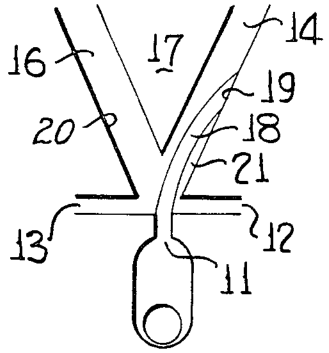
FIGURE 3 is a front view of a conventional pure fluid boundary layer amplifier.

Referring now specifically to FIGURE 3 of the accompanying drawings, there is illustrated a conventional boundary layer type of pure fluid system. In a system of this type, there is provided a power nozzle 11, a pair of control nozzles 12 and 13, and a pair of output channels 14 and 16 having a common divider 17 situated therebetween and defining one wall of each of the passages 14 and 16.

In a system of this type, the position of maximum stability of a power stream 18 is with the power stream attached to one of the sidewalls defining the device; for instance, a right sidewall 19. The region between the stream 18 and sidewall 19 is commonly called the "attachment" or "boundary layer" bubble and is designated by the reference numeral 21 herein. The region 21 is a region of greatly reduced pressure relative to the region immediately to the left of the stream and thus, the stream is held very tightly in its deflected position. In a completetly symmetrical unit, the stream 18, upon initial issuance from the nozzle 11, may attach to either the right or the left sidewall in a completely random manner. The stream, when directed along the centerline of the apparatus towards the apex of the divider 17 is in its position of maximum instability since the slightest perturbation in its flow produces a small deflection toward one or the other of the sidewalls. Upon such a deflection, the stream becomes more efficient in entraining air on the side of the device towards which it is deflected than on the other side, thereby reducing the pressure on this side, immediately establishing a differential in pressure across the stream which further deflects the stream, further increases the differential in pressure and results in the stream being rapidly diverted to the sidewall toward which the stream was initially deflected.

In order to move the stream, for instance, from the right side of the apparatus to the left side thereof, sufficient fluid must be introduced into the system at a sufficiently rapid rate to cause the pressure in the boundary layer region 21 to rise above the pressure to the left side of the stream in the example illustrated. The pressure differential thus created moves the stream away from the sidewall 19 and past the apex of the divider at which time the stream reduces the pressure on the left side of the apparatus to a value lower than on the right side thereof. The stream is now deflected to the left side of the apparatus and attaches to a left sidewall 20.

Figure 4:
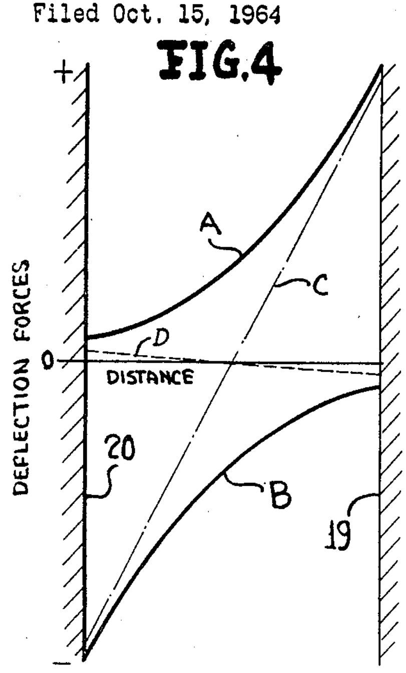
FIGURE 4 is a graph illustrating effects of the sidewalls of the device of FIGURE 3 on the power stream of the device.

The sidewall effect on the forces developed on the power stream as a result thereof can be readily understood by reference to FIGURE 4 of the accompanying drawing. The drawing is a graph of a force versus distance diagram with the curve A representing the restoring force exerted on a power stream by the sidewall 19, in the absence of the sidewall 20, and the curve B is a diagram of the forces exerted on a power stream by the sidewall 20 in the absence of sidewall 19. Forces which attempt to deflect the stream to the right are considered for purposes of this diagram as positive forces, whereas forces exerted on the stream which tend to deflect it to the left as illustrated in FIGURE 4 are considered to be negative forces. The graph of the force diagram contains a third line C which is the resultant of the forces exerted by the sidewalls 19 and 20 when both sidewalls are present in a given bistable device. It will be noted that, when an apparatus is provided with a right sidewall, such as sidewall 19, a maximum force tending to deflect the power stream to the right is exerted when the stream is actually attached to the sidewall. As the stream is moved to the left, away from the sidewall 19, the restoring force decreases hyperbolically approaching zero force as the stream is deflected an infinite distance from the sidewall. The effect of the sidewall 20 on the power stream in the absence of the sidewall 19 is also a function in which the maximum force is developed when the stream is attached to the sidewall, the force decreasing hyperbolically as the stream is moved away from the left sidewall 20. If a device is provided with two sidewalls, and these sidewalls are symmetrical with respect to the power orifice of the device, which is the case illustrated in FIGURE 4, the resultant force exerted on the power stream is often a straight line which passes through zero at a point equidistant between the sidewalls 19 and 20.

If the power stream is initially established through the center of the device so that it is at all times equidistant between the two sidewalls 19 and 20, there is no resultant force tending to reflect the stream to one or the other of the sidewalls. However, as is apparent from the curve C, even a minor deflection of the stream toward one or the other of the sidewalls results in a relatively large net force towards this sidewall which produces further deflection of the stream in the initial direction. Further deflection of the stream results in a further increase in the net force operating on the stream and the stream is switched rapidly to the sidewall towards which it was initially deflected.

Figure 5:
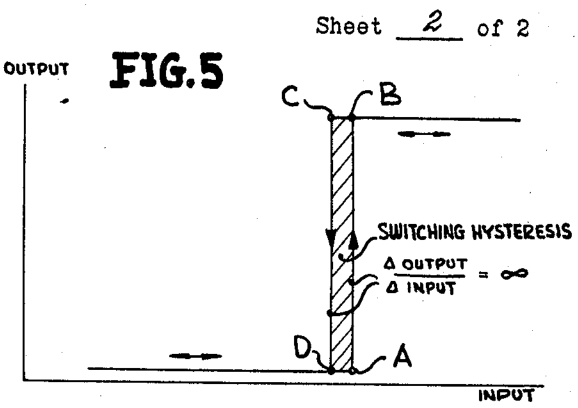
FIGURE 5 is a graph of the switching hysteresis of the device of FIGURE 3 resulting from sidewall effects.

The response of such a device to an input signal is illustrated in FIGURE 5 of the accompanying drawings, which is a plot of output signal versus input signal. This curve is actually an idealized curve but is very close to being a true plot of the output versus input function of a device such as illustrated in FIGURE 3. It will be noted that, if an input signal is initially applied, it has no effect upon the output signal until the input signal reaches an amplitude designated by the point A on the curve. When the signal reaches the point A, the power stream switches without any further increase in input signal to a second output channel at which the output, for purposes of this graph, is being observed. The output signal rises almost immediately from the point A to the point B on the curve at which time the power stream has been switched from one sidewall to the other sidewall. Further increases in the input signal have substantially no effect upon the output signal. Of course, to the extent the input signal is added to the output signal, there will be a slight rise in the output signal level.

An input signal is now provided which tends to deflect the power stream away from the output channel being observed. The input signal must be increased beyond the point at which the stream switched to this particular output channel, and more specifiically, must be increased to a point C before the stream is switched back to its original position. As soon as this happens, the output signal in the channel being observed falls to the original level of signal in that channel as designated by the point D. Further increases in the input signal now produce no further reduction in the output signal.

The shaded area defined by the points A, B, C and D is known as the switching hysteresis of the apparatus. This hysteresis loop results from the fact that, during the initial deflection of the power stream away from a sidewall to the center of the device, the input signal must provide sufficient energy to overcome the force of the sidewall to which it was attached. However, once the input signal has moved the stream slightly past the center of the device, the opposite sidewall takes effect and fully deflects the stream to its new position. Thus, during the initial half of deflection, the control signal must supply energy to the unit resulting in hysteresis; whereas during the second half of deflection of the stream, deflection follows the ideal characteristic curve. Since the control signals are opposed for purposes of deflecting the stream, first from one sidewall to the other and then from the other sidewall back to the first, and their directions are plotted oppositely in the output versus input curve of FIGURE 5, a hysteresis loop results and represents the energy required to deflect the stream in one direction and then the other.

The graph of FIGURE 5 indicates two important points. The first is that, in order to switch a bistable fluid amplifier, the input signal must rise to a level of point A which will be different for each design of bistable device, and during this signal rise, it must deliver sufficient energy to the device to overcome the restoring wall effect forces (FIGURE 4, curve C). Furthermore, sufficient energy has to be delivered during successive switching to overcome the switching hysteresis. The speed of response of such a device is obviously limited by the rate at which energy can be delivered. In a practical device, the total amount of energy required to deflect the stream from one wall to another cannot be delivered instantaneously, but must, in a sense, be accumulated.

The second feature that is disclosed by the curve of FIGURE 5 is that, if the stream is maintained in a position towards the center of the apparatus, the gain of the device is very high (the infinite gain of FIGURE 5 being the ideal case) and the input signal level required to produce switching varies from the point D to A in the one case and B to C in the other rather than being of an amplitude A or C relative to the zero input signal point on the graph. With input signals of such low intensity required, and the very high gain of the apparatus, it is apparent that the amount of energy required to produce an average displacement of the stream relative to the splitter of the device is quite small and may be delivered quite rapidly, thereby materially increasing the rate of response of the apparatus.

It should be noted that, in order to take advantage of the above phenomena, the power stream must be maintained approximately at the center of a bistable device and, in accordance with the present invention, this is achieved by employing an oscillator having a characteristic such that the power stream oscillates through relatively small amplitudes about the apex of the divider of the unt, such as the apex 17 of the apparatus of FIGURE 3. By this procedure, the stream is maintained in a position of maximum instability; that is, in a position where the apparatus has a maximum gain and therefore requires a minimum of energy to produce asymmetry of the oscillation of the stream relative to the divider. In consequence, the speed of response of the device is greatly increased above the speed of response of a pure fluid element in which the power stream, at the time of initiation of an input signal, is in a position of maximum stability, a position of low gain.

Figure 6:
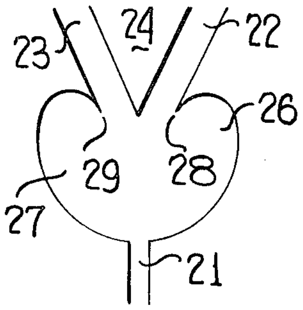
FIGURE 6 is a front view of a pure fluid oscillator.

One apparatus for achieving such operation is illustrated in FIGURE 6 of the accompanying drawings, which illustrates an analog device having a very rapid rate of response.

Referring specifically to FIGURE 6, there is illustrated a pure fluid oscillator of the double-lobe type. This oscillator is provided with a main power nozzle 21, two output passages 22 and 23 separated by a symmetrically located divider 24 (although the divider is not necessarily symmetrically located in all systems) and is further provided with two generally semicircular regions 26 and 27 disposed between the divider 24 and the power nozzle 21. The walls defining the regions 26 and 27 intersect with the outer walls defining the output passages 22 and 23 in cusps 28 and 29. Since the regions 26 and 27 are not vented to the atmosphere or other stable pressure source, the apparatus is a boundary layer unit. When the power stream is diverted toward the side of the apparatus on which a particular cusp is located, the cusp peels off a portion of the stream so that the stream is diverted into the associated region and deflected by the walls defining this region back against the power stream thereby to deflect the power stream in the opposite direction. More particularly, if the power stream issuing from the nozzle 21 is, for instance, diverted somewhat to the right by a minor perturbation in its flow pattern which results in further deflection of the stream due to an enhanced boundary layer effect on the right side, a portion of the fluid of the power stream is diverted by the cusp 28 into the region 26 in which it follows a clockwise flow until it issues from this region against the power stream at the point at which the stream issues from the power nozzle 21. The flow from region 26 deflects the power stream to the left of the apparatus and out of the output channel 23, a portion of the fluid being peeled off by the cusp 29, being diverted through the region 27 back against the power stream and deflects the power stream to the right.

An oscillator of the type illustrated in FIGURE 6 is capable of oscillation at 100 kilocycles per second, such devices having been built and having been operated at such frequencies. A device of this type, whether operating at its maximum frequency or at lower frequencies, does not produce complete deflection of the power stream issued by the nozzle 21 so that at all times a portion of the stream is issuing out of both of the channels 22 and 23. This is desirable since this means that the power stream is never very far away from its point of maximum instability which, in a device as illustrated in FIGURE 6, is along the centerline of the apparatus since the device is a boundary layer unit.

Figure 7:
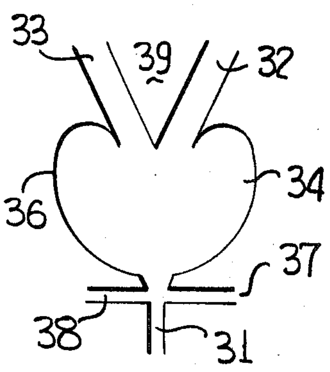
FIGURE 7 is a front view of a pure fluid oscillator modified to provide a high speed pure fluid proportional amplifier in accordance with the present invention.

Referring now specifically to FIGURE 7 of the accompanying drawings, there is illustrated a first embodiment of the present invention which is actually a modification of the oscillator of FIGURE 6. The oscillator has been modified to provide control passages on opposite sides of the power nozzle. More particularly, there is provided a power nozzle 31, a pair of output passages 32 and 33, feedback lobes 34 and 36, and right and left control passages or nozzles 37 and 38. In this device, the power stream oscillates about the apex of the divider 39, the deflection to the two sides of the apex being only sufficient to cause the stream to supply small quantities of fluid to the feedback lobes 34 and 36.

Assume initially that a bias signal; that is, a small amount of flow is introduced into only one control passage; for instance, the control passage 37. The total deflection of the power stream to the left is increased by this signal since now the control flow is added to the feedback flow through the loop 34, thus increasing the energy applied to deflect the stream to the left. Also, the stream must supply a greater quantity of fluid to the lobe 36 for feedback purposes in order to overcome both the flow through the lobe 34 and the control flow through the control passage 37. On the other hand, the stream does not have to deflect as far to the right as in the absence of flow from passage 37 since the control flow supplies a part of the energy required to deflect the stream back to the left. The net effect of these two results is that the stream is diverted during a greater proportion of its total cycle toward the left side of the device than toward the right and the left output passage receives a greater portion of the main flow over a larger period of time.

Figure 8:
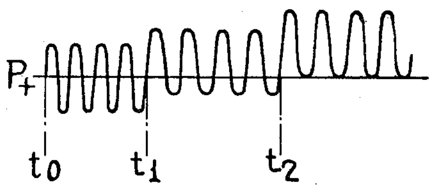
FIGURE 8 is a graph of the output waveform of the amplifier of FIGURE 6.

The above-stated effects are illustrated in FIGURE 8. The waveform of FIGURE 8 between times $t_0$ and $t_1$ is a symmetrical flow pattern developed in the absence of control flow through the passage 37, the centerline of this flow being at some positive pressure. The waveform illustrates conditions in the output channel 33. At the time $t_1$, flow is introduced into the channel 37 and the flow pattern becomes unsymmetrical about the P+ line with a greater portion of the waveform being above the line and a lesser portion being below the line P+. At time $t_2$, the signal applied to the control nozzle 37 is further increased and the waveform pattern becomes even more unsymmetrical about the pressure centerline P+.

The waveform pattern of FIGURE 8 is equally applicable to the output passage 32 when the bias flow is applied to the input passage 38. The waveform patterns of FIGURE 8 are, of course, idealized since they illustrate a condition in which the response of the apparatus to a change in flow in the control passages is instantaneous which, of course, is not obtainable in a practical system. However, as indicated above, in a system such as illustrated in FIGURE 7, the frequency response of the apparatus lies, depending upon design, between one-fifth and one-tenth of the frequency of oscillation and, if the oscillator is operating at 100 kilocycles, then the response frequency of the device is between 10 and 20 kilocycles. If the device is operating at a basic frequency of 50 kilocycles, then the frequency of response will lie between 5 and 10 kilocycles per second. It is apparent from the operation described above that pulse signals as well as oscillatory signals may be applied to the passage 37 and/or 38 and thus, the device may operate either on analog or pulse signals.

The form of oscillator employed is relatively immaterial. External feedback oscillators may be provided; organ pipe oscillators and driven monostable devices may be employed and various of the other types of known pure fluid oscillators may be provided with control passages so as to operate in the manner indicated above relative to the device of FIGURE 7. Other types of oscillators which may be employed are disclosed in U.S. Patent No. 3,185,166 to Horton et al., for "Fluid Oscillator."

It is seen from the above description that the apparatus of the present invention utilizes a phenomenon of pure fluid amplifiers previously considered to be undesirable; that is, the high degree of instability of the stream in specific locations of a pure fluid boundary layer type of amplifier or pure fluid amplifier depending upon the type of amplifier modified to become an oscillator, the instability may lie in the center of the device or at extremities of the deflection of the stream.

The device of the present invention also provides a ready means for rejecting unwanted frequency components. Thus, if it is desired to eliminate, for instance, all frequency components above 2,500 cycles per second in a system, then by choosing oscillators which oscillate at, for instance, 2,500 cycles per second, the oscillators cannot respond appreciably to signals which approach the basic oscillatory frequency. Thus, any signals which approach the basic frequency of the device are not passed to the subsequent device and the amplifier not only amplifies signals in the desired range but rejects signals in the undesired range. The rejection frequency may be varied by varying supply pressure to the power nozzle of the oscillator, since its frequency of oscillation is a function of supply pressure. Other techniques known in the art may be employed to vary frequency of the oscillators.

A further advantage of this type of system is that undesired loss in coupling signals between devices may readily be reduced by tuning the transmission passages to the frequency of a submultiple or multiple of the oscillator frequency.

Figure 9:
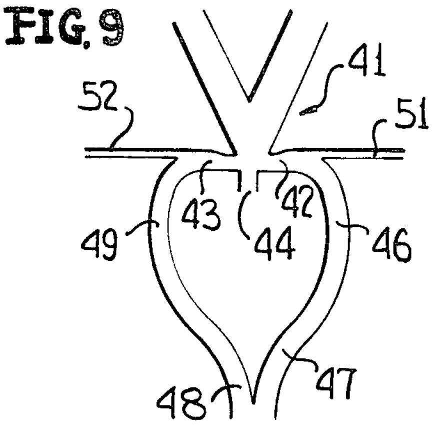
FIGURE 9 is a front view of an externally driven pure fluid amplifier of the present invention.

It should be noted that, thus far, only self-oscillatory systems have been discussed. It is to be understood, however, that externally excited oscillatory systems may also be employed and, to illustrate such a system, reference is made to FIGURE 9 of the accompanying drawings. This figure illustrates a conventional basic flip-flop device in which, in the absence of an input signal, the power stream attaches to one or the other of the sidewalls of the device and remains thus attached. However, if the device is driven by an external source such that the power stream is not permitted to attach to one of the sidewalls but is caused to oscillate about the divider, then the same effect is achieved as may be achieved by the self-oscillatory systems. For example, a basic flip-flop, designated by reference numeral 41, is provided with a pair of control passages 42 and 43 and a power nozzle 44. The control nozzle 42 is connected via a channel 46 to one output passage 47 of a device having a further output passage 48. The output passage 48 is connected via a channel 49 to the control passage 43 of the flip-flop 41.

Differentially related oscillatory signals are developed in the passages 47 and 48 and have a minimum pressure developed therein such that the power stream issued by the power nozzle 44 of the flip-flop 41 cannot attach to one or the other of its two sidewalls but instead, oscillates about the divider of the flip-flop at the basic frequency applied to the control nozzles 42 and 43. One or both of the control nozzles 42 and 43 may be connected to a signal or signal sources via one or both passages 51 and 52.

The operation of this device is the same as described relative to FIGURE 7 in that, as the pressure or fluid flow rate through the passage 51 is varied, the center position of the power stream issued by nozzle 44 varies therewith so that the differential relationship between the fluid signals appearing in output passages of the flip-flop 41 vary and consequently produce a modulation of the basic oscillatory signal. The externally excited oscillator of the type illustrated in FIGURE 9 has one advantage over the self-oscillatory type of device in that, if the input oscillatory signal developed between channels 47, 48 is terminated and the flip-flop 41 is followed by a frequency band pass filter, such as a tuned passage, no signals pass through the system in the absence of oscillatory signals in passages 47 and 48. Thus, one can provide for frequency gating of signals; that is, a frequency sensitive and-gate where the oscillatory signal and an input signal must be supplied to produce an output signal.

Figure 11:
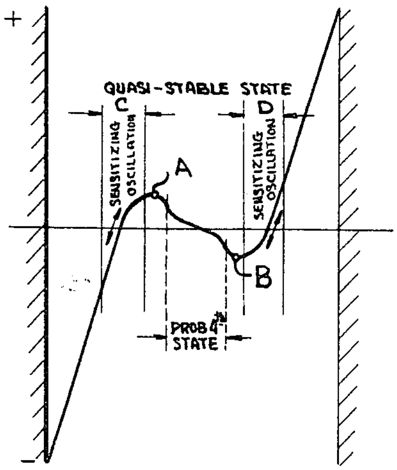
FIGURE 11 is a second graph illustrating the forces acting on the power stream of the tristable pure fluid amplifier of FIGURE 12.

All of the devices thus far described are analog in nature; that is, the output signal is proportional to the input signal. It is desirable, of course, to provide increased rate of response in digital elements as well as proportional or analog elements and this feature can also be achieved by applying the basic concepts of the present invention. Referring again to FIGURE 4, it will be noted that there is a fourth line on the graph, this being designated by the letter D. This line indicates the nature and magnitude of a restoring effect, i.e., a force tending to always restore the power stream to its center position, resulting from the momentum of the stream. The stream in issuing from the power nozzle is directed along the center of the device and its momentum, which is a vectorial quantity, exerts a force which opposes any force tending to deflect the stream from its center position. In a bistable element, this force is insufficient to overcome the bistable effects exerted by the boundary layer walls, but it is present. If now an element is provided which is tristable in nature, a characteristic curve such as illustrated in FIGURE 11 is developed.

Figure 10:
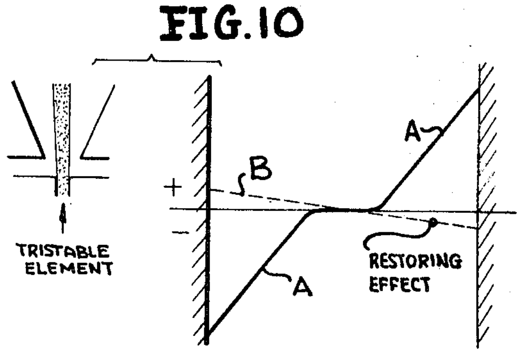
FIGURE 10 is a graph of the forces acting on the power stream of a pure fluid tristable device.

Referring, however, for the moment to FIGURE 10, there is illustrated a force diagram of a tristable element having a curve A illustrating the forces on the stream resulting from the sidewalls and a curve B illustrating the restoring force due to momentum of the power stream. It is apparent that in any digital fluid element employing boundary layer effects the boundary walls may be displaced sufficiently far from the centerline of the power nozzle, such that when the stream is issued directly up the center of the device there is essentially no residual force on the power stream tending to deflect it to one side or the other. This really means that the sidewalls are located such that the restoring force on the stream becomes substantially zero as the stream approaches its center position. If now, the restoring force resulting from the momentum of the power stream is superposed on the forces resulting from the boundary walls in a tristable device, the characteristic curve of FIGURE 11 is achieved. In the region of the graph between the points A and B, the forces are inverted and act on the power stream to maintain it in its center position. If the stream is moved to the left of the point A, it is deflected to the left sidewall, whereas if the stream moves to the right of point B, it is deflected to the right sidewall.

If, on the other hand, the stream is caused to oscillate in the region designated by letter C, it can be seen that the amount of energy required to move the stream from this position over a second region designated by the letter D is considerably less than the energy required to move the stream from attachment to one side wall to attachment to the opposite sidewall.

Figure 12:
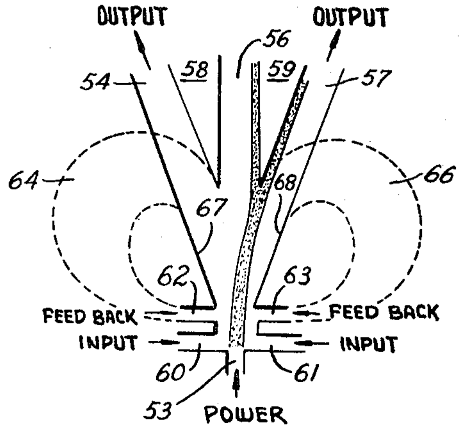
FIGURE 12 is a front view of a pure fluid bistable amplifier employing the techniques of the present invention.

The above object is achieved by the apparatus illustrated in FIGURE 12 of the accompanying drawings. Referring specifically to FIGURE 12, there is illustrated a bistable device having a power nozzle 53, three output channels 54, 56 and 57, separated from one another by dividers 58 and 59, respectively. The apparatus is provided with four input nozzles 60, 61, 62 and 63. The nozzles 60 and 61 are intended to be employed for input signals whereas the nozzles 62 and 63 are employed to provide feedback signals. A feedback loop 64 extends from the channel 54 to the nozzle 62 and a feedback loop 66 extends from the output passage 57 to the nozzle 63. The apparatus is further provided with left and right sidewalls 67 and 68, respectively, which are located both as to displacement and angulation, relative to the centerline of the nozzle 53, such that if the power stream is initially issued at the center of the device, it will proceed through the output passage 56 and is not deflected to either of the sidewalls 67 or 68.

Assume initially, however, that an input signal has been applied to the left signal nozzle 60 such that the power stream is deflected towards the right sidewall 68. As fluid enters the passage 57, some of this fluid is fed back through the channel 66 thereby tending to deflect the stream somewhat to the left thereby decreasing the feedback signal. The boundary layer effect tending to pull the stream to the right now predominates and tends to return the stream to the right until the feedback signal again overcomes the sidewall or boundary layer effect. Thus, the stream oscillates about the apex of the divider 59 and, for purposes of relating this to the FIGURE 11, the stream is located in the region D of this graph. If now a signal is coupled to the nozzle 61 of sufficient intensity and energy to move the stream so that it approaches the left sidewall 67, the stream now oscillates about the apex of the divider 58 and is located in the region C of the graph of FIGURE 11. It will be noted that in each of its two oscillatory positions, the stream is unable to attach to the adjacent sidewall, and thus maximum boundary layer effect is defeated. The stream may be switched between its two stable states by means of an input signal requiring delivering less energy than would be the case in the usual bistable device such as illustrated in FIGURE 3 and thus the speed of response of the apparatus of FIGURE 12 is considerably greater than that of the apparatus of FIGURE 3. Output signals would, of course, be taken from the output passages 54 and 57.

An additional feature which is quite important and results from the utilization of the apparatus of FIGURE 12 is that, by making the feedback passages 64 and 66 of different lengths, the frequency of oscillation of the stream about the two dividers may be made different and frequency recognition techniques, i.e. (frequency gating) may be employed, thereby providing an additional safety factor in the recognition of signals.

It is apparent that, by providing two dividers in addiion to dividers 58 and 59 and two feedback passages in addition to 64 and 66, one may provide a tristable apparatus which may be switched rapidly between any one of its three stable states. The only real limit on expansion of this type is the number of input signals which may be fed into a system of this type.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A pure fluid amplifier having improved high frequency response characteristics comprising:
- means for receiving a stream of fluid;
- a fluid interaction region;
- means for issuing a stream of fluid through said interaction region towards said means for receiving;
- control stream means for controllably deflecting said stream of fluid;
- means for developing a force field in which the positional stability of said stream varies as a function of the position of said stream in said interaction region;
- means for oscillating said stream at small amplitudes of oscillation about a mean position such that in the absence of said control stream means said mean position coincides with a position of minimum stability and such that said amplitudes of oscillation are sufficiently small relative to the transverse dimension of said interaction region that in the absence of said control stream means said stream remains substantially proximate said position of minimum stability;
- said control stream means deflecting the oscillating stream so that said mean position is shifted relative to said means for receiving.

2. The pure fluid amplifier of claim 1 wherein said means for receiving comprises a pair of output channels, a V-shaped flow divider for separating said output channels, the apex of said divider and said means for issuing defining said position of minimum stability about which said stream quiescently oscillates.

3. The pure fluid amplifier of claim 2 wherein said amplitudes of oscillation are sufficiently small such that in the absence of said control stream means at least a portion of said stream of fluid is at all times issuing out of both of said output channels.

4. The pure fluid amplifier of claim 1 wherein said means for receiving comprises three output channels, a pair of V-shaped flow dividers each separating a respective adjacent pair of channels, said means for issuing and the apex of a first of said flow dividers defining said position of minimum stability about which said stream quiescently oscillates, said means for issuing and the apex of a second of said flow dividers defining a second position of minimum stability, said means for deflecting causing said stream to shift to said second position of minimum stability.

5. The pure fluid amplifier of claim 4 wherein said amplitudes of oscillation are sufficiently small that in the absence of said control stream means a portion of said stream of fluid is at all times issuing out of both of a respective adjacent pair of said output channels.

6. The pure fluid amplifier of claim 1 wherein said means for developing a force field includes at least one sidewall for defining one side of said interaction region, said sidewall being positioned such that boundary layer effects between said stream and said sidewall tend to deflect said stream towards said sidewall, wherein said amplitudes of oscillation are sufficiently small that said stream remains remote from said sidewall in the absence of said control stream means.

7. The pure fluid amplifier of claim 6 wherein said means for receiving comprises three output channels, a pair of V-shaped flow dividers each separating a respective adjacent pair of said channels, said means for issuing and the apex of a first of said flow dividers defining said position of minimum stability about which said stream quiescently oscillates, said means for issuing and the apex of a second of said flow dividers defining a second position of minimum stability, said means for deflecting causing said stream to shift to said second position of minimum stability.

8. The pure fluid amplifier of claim 7 wherein said amplitudes of oscillation are sufficiently small that in the absence of said control stream means a portion of said stream of fluid is at all times issuing out of both of a respective adjacent pair of said output channels.

9. The pure fluid amplifier of claim 6 wherein said means for receiving comprises a pair of output channels, a V-shaped flow divider for separating said output channels, the apex of said divider and said means for issuing defining said position of minimum stability about which said stream quiescently oscillates.

10. The pure fluid amplifier of claim 9 wherein said control stream means comprises means for directing at least one fluid control stream into said interaction region and in interacting relation with said stream of fluid so that said means position is shifted as a function of said control stream.

11. The pure fluid amplifier of claim 10 wherein said amplitudes of oscillation are sufficiently small such that in the absence of said control stream means at least a portion of said stream of fluid is at all times issuing out of both of said output channels.

12. The pure fluid amplifier of claim 6 wherein said means for developing a force field includes a second sidewall for defining a second side of said interaction region opposite said first side, said second sidewall being positioned such that boundary layer effects between said stream and said second sidewall tend to deflect said stream towards said second sidewall, said amplitudes of oscillation being sufficiently small that the oscillating stream of fluid remains remote from said second sidewall in the absence of said control stream means.

13. The pure fluid amplifier of claim 12 wherein said means for receiving comprises three output channels, a pair of V-shaped flow dividers each separating a respective adjacent pair of said channels, said means for issuing and the apex of a first of said flow dividers defining said position of minimum stability about which said stream quiescently oscillates, said means for issuing and the apex of a second of said flow dividers defining a second position of minimum stability, said means for deflecting causing said stream to shift to said second position of minimum stability.

14. The pure fluid amplifier of claim 13 wherein said control stream means comprises means for directing at least one fluid control stream into said interaction region and in interacting relation with said stream of fluid so that said mean position is shifted as a function of said control stream.

15. The pure fluid amplifier of claim 14 wherein said means for oscillating comprises stream feedback means.

16. The pure fluid amplifier of claim 14 wherein said means for oscillating comprises means external to said pure fluid amplifier.

17. The pure fluid amplifier of claim 12 wherein said means for receiving comprises a pair of output channels, a V-shaped flow divider for separating said output channels, the apex of said divider and said means for issuing defining said position of minimum stability about which said stream quiescently oscillates.

18. The pure fluid amplifier of claim 17 wherein said control stream means comprises means for directing at least one fluid control stream into said interaction region and in interacting relation with said stream of fluid so that said mean position is shifted as a function of said control stream.

19. The pure fluid amplifier of claim 18 wherein said means for oscillating comprises stream feedback means.

20. The pure fluid amplifier of claim 18 wherein said means for oscillating comprises means external to said pure fluid amplifier.

References Cited

UNITED STATES PATENTS

| | | | |
|---|---|---|---|
| 3,001,698 | 9/1961 | Warren | 137—81.5 |
| 3,158,166 | 11/1964 | Warren | 137—81.5 |
| 3,181,545 | 5/1965 | Murphy | 137—81.5 |
| 3,185,166 | 5/1965 | Horton et al. | 137—81.5 |
| 3,228,411 | 1/1966 | Straub | 137—81.5 |
| 3,238,958 | 3/1966 | Warren et al. | 137—81.5 |
| 3,240,219 | 3/1966 | Dexter et al. | 137—81.5 |
| 3,228,410 | 1/1966 | Warren et al. | 137—81.5 |
| 3,275,016 | 9/1966 | Wood | 137—81.5 |

SAMUEL SCOTT, *Primary Examiner.*